(12) United States Patent
Zhang et al.

(10) Patent No.: US 11,498,773 B1
(45) Date of Patent: Nov. 15, 2022

(54) MATERIAL LAYERED CONVEYING DEVICE BASED ON DISASSEMBLY LINE

(71) Applicant: Southwest Jiaotong University, Sichuan (CN)

(72) Inventors: Zeqiang Zhang, Sichuan (CN); Hongbin Zheng, Sichuan (CN); Yanqing Zeng, Sichuan (CN); Silu Liu, Sichuan (CN); Dan Ji, Sichuan (CN); Xiaoyue Fang, Sichuan (CN)

(73) Assignee: Southwest Jiaotong University, Chengdu (CN)

( * ) Notice: Subject to any disclaimer, the term of this patent is extended or adjusted under 35 U.S.C. 154(b) by 0 days.

(21) Appl. No.: 17/867,708

(22) Filed: Jul. 19, 2022

(30) Foreign Application Priority Data

Jul. 20, 2021 (CN) .......................... 202110817706.7

(51) Int. Cl.
*B65G 47/64* (2006.01)
*B65G 37/00* (2006.01)
*B65G 41/00* (2006.01)

(52) U.S. Cl.
CPC ......... *B65G 47/643* (2013.01); *B65G 37/005* (2013.01); *B65G 41/003* (2013.01)

(58) Field of Classification Search
CPC .................................................. B65G 47/643
USPC ........................................ 198/369.6, 463.3
See application file for complete search history.

(56) References Cited

U.S. PATENT DOCUMENTS

| 3,024,890 A | * | 3/1962 | Belk | B65G 65/00 |
| | | | | 198/463.3 |
| 3,700,090 A | * | 10/1972 | Pearson | B65G 47/8853 |
| | | | | 198/463.3 |
| 4,019,623 A | * | 4/1977 | Tassi | B65G 15/22 |
| | | | | 198/457.03 |
| 4,274,529 A | * | 6/1981 | Mori | H05K 13/0061 |
| | | | | 198/463.3 |
| 4,408,950 A | * | 10/1983 | Laskey | B30B 15/30 |
| | | | | 198/463.3 |
| 4,867,299 A | * | 9/1989 | Fukuoka | B65G 47/71 |
| | | | | 198/463.3 |

(Continued)

FOREIGN PATENT DOCUMENTS

| CN | 204675339 U | 9/2015 |
| CN | 105383911 A | 3/2016 |

(Continued)

*Primary Examiner* — Joseph A Dillon, Jr.

(57) ABSTRACT

A material layered conveying device based on a disassembly line, including a front section conveyor belt, a rear section conveyor belt, and a lower conveyor belt. An interval between the front and rear section conveyor belts is provided with two sets of movable conveyor belts arranged in side by side parallel, a lifting conveyor belt is provided below the interval and adjacent to and horizontal with the lower conveyor belt, and a lifting conveyor belt elevator is provided under the lifting conveyor belt. The lifting conveyor belt is driven vertically up, and the lifting conveyor belt is horizontal with the front and rear section conveyor belts when the lifting conveyor belt is moved to a maximum distance. The device adopts the movable dual conveyor belts of the respective levels of the upper and lower conveyor belts, and can achieve synchronous high-low transferring of the material when the material is conveyed.

5 Claims, 3 Drawing Sheets

(56) References Cited

U.S. PATENT DOCUMENTS

| | | | | |
|---|---|---|---|---|
| 5,429,223 A | * | 7/1995 | Moeller | B65G 47/5154 |
| | | | | 198/369.1 |
| 5,810,149 A | * | 9/1998 | Sandberg | B65G 47/71 |
| | | | | 198/369.2 |
| 8,056,701 B2 | * | 11/2011 | Sugimoto | B65G 35/06 |
| | | | | 198/801 |
| 11,014,766 B2 | * | 5/2021 | Hartmann | B65G 37/005 |
| 2012/0160633 A1 | * | 6/2012 | Jiang | B65B 5/00 |
| | | | | 198/463.3 |
| 2018/0072512 A1 | * | 3/2018 | Sonoura | B65G 47/643 |

FOREIGN PATENT DOCUMENTS

| | | | | |
|---|---|---|---|---|
| CN | 207329686 U | | 5/2018 | |
| CN | 208994612 U | | 6/2019 | |
| CN | 110406953 A | | 11/2019 | |
| CN | 210092278 U | | 2/2020 | |
| CN | 210587951 U | | 5/2020 | |
| CN | 113213096 A | * | 8/2021 | |
| CN | 113320958 B | * | 3/2022 | B65G 37/00 |
| DE | 3806036 A1 | | 9/1989 | |
| DE | 102006050649 B3 | * | 7/2008 | B65G 47/642 |

\* cited by examiner

MATERIAL LAYERED CONVEYING DEVICE BASED ON DISASSEMBLY LINE

FIELD OF THE INVENTION

The present invention relates to a field of material conveying, and more particularly to a material layered conveying device based on a disassembly line.

BACKGROUND OF THE INVENTION

Conveyor belts in modern industry are an important part of the formation of the production line. Types of conveyor belt can be an integral or modular, including a roller type, belt type and so on, and can be used in a variety of scene applications. For conveyor belts which are applied in disassembly lines of disassembly waste or used material, in addition to the conventional conveying of the material on the horizontal plane, it is often necessary to perform high and low transferring of the material to achieve multi-wire conveying or corresponding components disassembly, therefore effectively improve conveying and disassembly efficiency.

In public related patents, China Patent CN2020200895626.4 discloses a dual conveyor belt elevator, rapid and stable conveying of component parts between upper and lower conveyor belts is achieved by providing lifting plates driven by a cylinder between the upper and lower conveyor belts. The problem in the above device is that the lift plates are located on the same side of the conveyor belt, and the transport direction of the upper and lower conveyor belts should be opposite to achieve a smooth transfer of the component part material between the two conveyor belts, which limits the overall setting orientation of the conveyor belts, and thus it is difficult to apply in some cases those spatial range is limited and disassembly positions are fixed.

SUMMARY OF THE INVENTION

In view of the above, an object of the present invention is to provide a material layered conveying device based on a disassembly line, which uses a conveyor belt for material conveying between high and low position, and can be driven by a lifting mechanism, such that the transfer of the conveyor belt carrying the material between the high and low position can be achieved, and high efficiency and continuous high and low operation for the material to be disassembled can be achieved.

The technical solution provided by the present invention is to provide a material layered conveying device based on a disassembly line, including a front section conveyor belt, a rear section conveyor belt, and a lower conveyor belt, the front section conveyor belt and the rear section conveyor belt are parallel arranged, and there is an interval between the front section conveyor belt and the rear section conveyor belt. The lower conveyor belt is parallel disposed below the front section conveyor belt and the rear section conveyor belt, and there are two sets of movable conveyor belts parallel arranged in the interval between the front section conveyor belt and the rear section conveyor belt.

Below the interval between the front section conveyor belt and the rear section conveyor belt is provided with a lifting conveyor belt arranged adjacent to and in a same horizontal level with the lower conveyor belt, and the length of the lifting conveyor belt is equal to the interval length between the front section conveyor belt and the rear section conveyor belt, so that when the lifting conveyor belt is vertically moved upward, it is capable of smoothly entering the interval between the front section conveyor belt and the rear section conveyor belt, to receive the material to be disassembled from the above ordinary front section conveyor belt or the rear section conveyor.

A conveyor belt elevator is also provided under the lifting conveyor belt, and the conveyor belt elevator is connected to the two sets of movable conveyor belts and the lifting conveyor belt respectively through two sets of conveyor belt lifting levers connected to its internal driving structure, and when the internal driving structure drives the conveyor belt lifting levers to move outward in an arc track, the movable conveyor belts and the lifting conveyor belt are caused to generate upward motion at a same time.

The lifting conveyor belt can be driven to move vertically upward by the conveyor belt elevator and the conveyor belt lifting lever, and when the lifting conveyor belt is moved to the maximum distance, it is parallel to the front section conveyor belt and the rear section conveyor belt, and at this parallel position the material to be disassembled is received, and after the lifting conveyor belt is reset to move downwards, the material can continue to travel to the lower conveyor belt to achieve the high and low transfer of the material.

One embodiment of the present invention is that the internal driving structure includes rotating mechanisms one-to-one corresponding to the conveyor belt lifting levers, and a driving member connected to a power source. The driving member is engaged with the rotating mechanisms, and the driving member is driven by the power source so as to drive the rotating mechanisms to move.

Furthermore, each of the conveyor belt lifting levers includes a movable conveyor belt strut, a backslash strut, and a lifting conveyor belt strut, and the movable conveyor belt strut and the lifting conveyor belt strut are in a V-shape obliquely arranged in a same common surface. The two sets of the conveyor belt lifting levers are in mirror symmetry, and the V-shaped openings facing to each other. When the two sets of conveyor belt lifting levers simultaneously move with the V-shape top end as its center, cause same movement of the movable conveyor belt strut, the backslash strut, and the lifting conveyor belt strut.

Furthermore, each of the two sets of the movable conveyor belt struts is directly connected to a side of the respective two sets of movable conveyor belt by a set of connecting strut. The two sets of the lifting conveyor belt struts are both connected to a side of the lifting conveyor belt through connecting strut-backslash strut-connecting strut connected in sequence.

Furthermore, the rotating mechanism is disposed at the V-shape top end of the conveyor belt lifting lever, and is fixed to the conveying belt lifting lever, so that when the rotating mechanism is engaged with the driving member to move, the rotating mechanism will rotate surrounding the V-shape top end and as well as its fixed connection position. The two sets can achieve isotropic curved rotation and inverse curved rotation of the conveyor belt lifting lever.

Furthermore, the backslash strut is movably connected to the connecting strut, so that the backslash strut can freely rotate surrounding a movable connection point on both sides thereof adjacent to the connecting strut. When the conveyor belt lifting lever is rotated outwards in inverse curved rotation, it will cause the backslash strut to rotate outward. Since the two sets of conveyor belt lifting levers move outward in inverse curved rotation, the horizontal displacement is replaced, remaining only the upward displacement, which finally results the lifting conveyor belt is lifted.

Similarly, when the conveyor belt lifting lever is rotated inward in isotropic curved rotation, it will forcibly pull down the backslash strut and cause it to move inward, which results getting down the conveyor belt.

Furthermore, the connecting strut is fixed to the lifting conveyor belt and the lifting conveyor belt strut, only the connection between the connecting strut and the backslash strut are movable, ensuring that the lifting conveyor belt can be successfully supported by the conveyor belt lifting lever.

The technical effect of the present invention is:

1. The device adopts the dual conveyor belt structure with respective levels of the upper and lower conveyor belts, and can high and low position transfer of the material when the material is conveyed, and the transfer is stable and efficient.

2. There is no need to set operation direction of the conveyor belt, avoiding additional or modifying the device to disassemble the line, saving costs, wide application range.

3. The high-low lifting transfer components are conveyor belts, and convention normal transport function of the conveyor belt can be maintained when no high-low transfer is needed, and the normal operation of the two conveyor belts can be maintained to ensure the overall efficiency of the disassembly production.

BRIEF DESCRIPTION OF THE DRAWINGS

In order to more clearly illustrate the technical solution of the present invention, the drawings described in the embodiment will be briefly described below, and it should be understood that the following drawings are only shown in some embodiments of the present invention, so it should be seen as a defined scope, and will be obtained in accordance with these figures, without paying creative labor, in terms of ordinary skill in the art.

Figure 1:
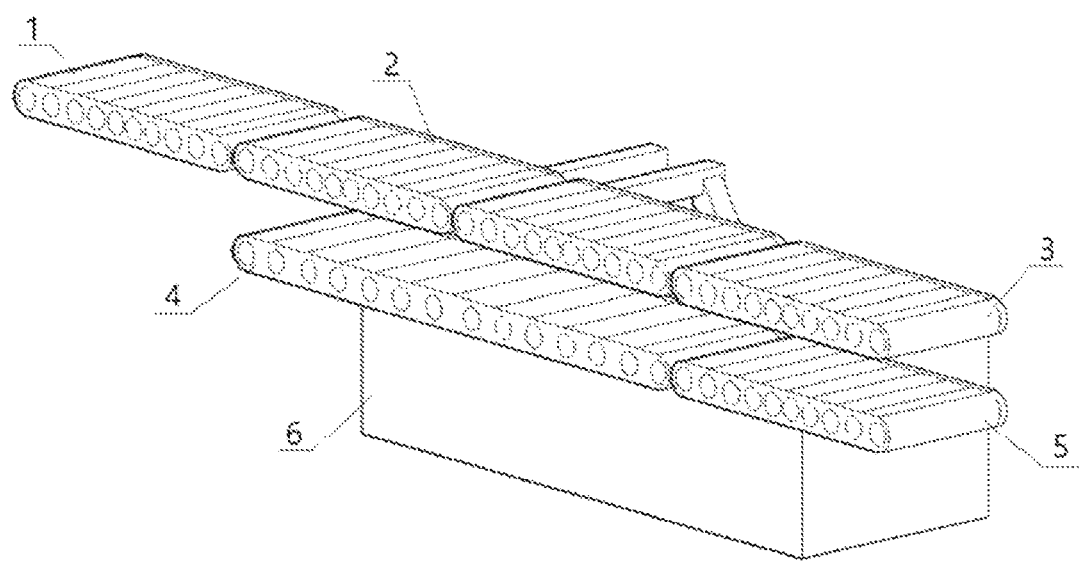
FIG. 1 is a perspective view of the present invention.

1 refers to the front section conveyor belt, 2 refers to movable conveyor belt, 3 refers to rear section conveyor belt, 4 refers to lifting conveyor belt, 5 refers to lower conveyor belt, 6 refers to conveyor belt elevator, 7 refers to conveyor belt lifting lever, 71 refers to movable convey belt strut, 72 refers to backslash strut, 73 refers to lifting conveyor belt struts, 8 refers to connecting strut, 9 refers to rotating mechanism, 10 refers to driving member.

DETAILED DESCRIPTION OF PREFERRED EMBODIMENTS

The present invention is further described in connection with the examples and drawings.

In order to make the objects, technical solutions, and advantages of the present invention, the technical solutions in the embodiments of the present invention will become apparent from the drawings in the embodiments of the present invention, and the embodiments of the embodiments of the present invention will be described in connection with the drawings of the embodiments of the present invention. It is a part of the embodiments of the present invention, not all of the embodiments. Based on the embodiments in the present invention, all other embodiments obtained by those of ordinary skill in the art are in the range of the present invention without creative labor. Thus, the following detailed description of the embodiments of the invention as provided in the drawings are not intended to limit the scope of the invention as claimed, but only the selected embodiments of the present invention are shown.

EMBODIMENT

Figure 2:
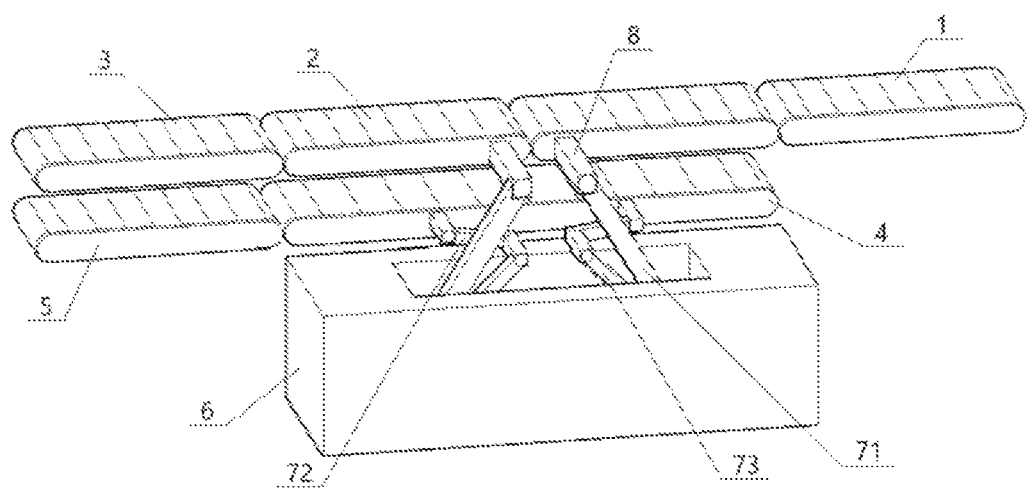
FIG. 2 is a schematic structural rear view of the present invention.
Figure 3:
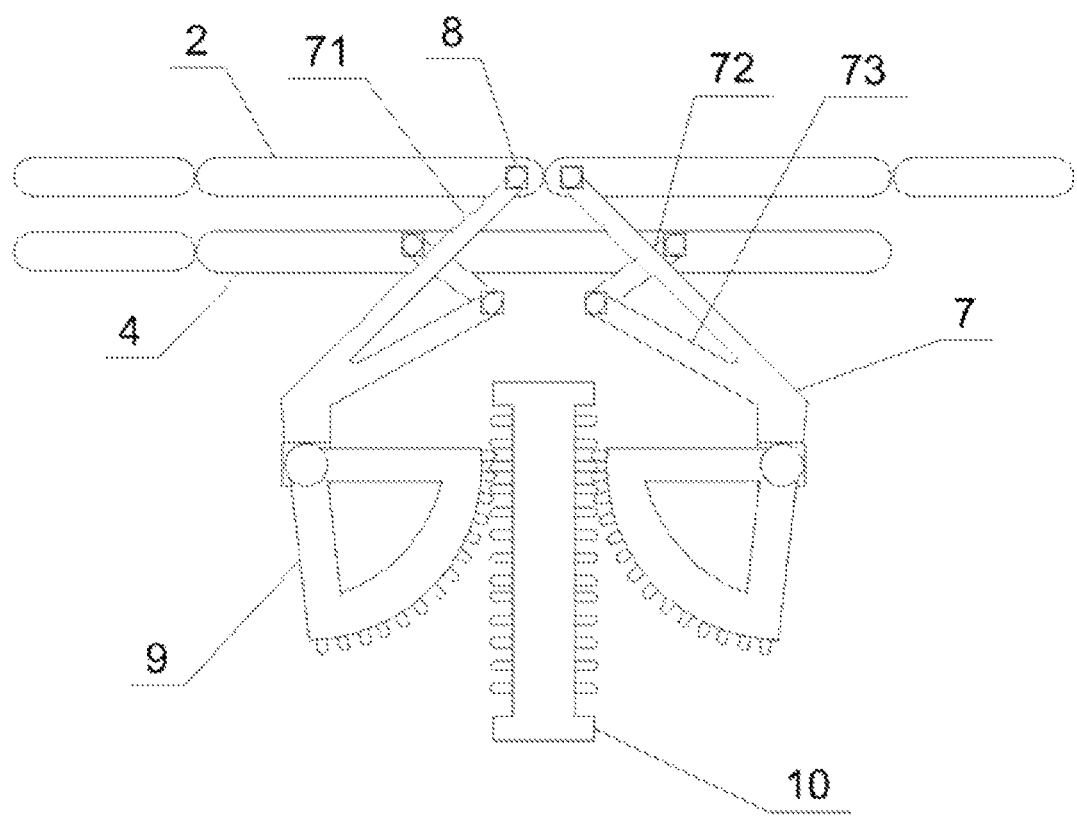
FIG. 3 is a schematic view of a core driving structure of the present invention.

See FIGS. 1 to 3, a material layered conveying device based on a disassembly line is shown.

The front section conveyor belt 1 is arranged horizontally with the rear section conveyor belt 3, and there is an interval between the front section conveyor belt 1 and the rear section conveyor belt 3. The lower conveyor belt 5 is disposed below and parallel with the front section conveyor belt 1 and the rear section conveyor belt 3. Two sets of movable conveyor belts 2 are arranged in parallel in the interval between the front section conveyor belt 1 and the rear section conveyor belt 3.

A lifting conveyor belt 4 is arranged horizontal and adjacent to the lower conveyor 5 below the interval between the front section conveyor belt 1 and the rear section conveyor belt 3, and the length of the lifting conveyor belt 4 is equal to the interval length between the front section conveyor belt 1 and the rear section conveyor belt 3. It is worth noting that, as shown in FIG. 2, in this embodiment, the lower conveyor belt 5 is only provided at a rear section of the lifting conveyor belt 4 for receiving the material from the upper layer. It is apparent that the lower conveyor belt 5 can also be set to at a front section of the lifting conveyor belt 4 for transferring material, thereby forming an upper and lower double layer to transfer the material, so that the lower conveyor belt 5 employed in this embodiment should not be considered a limitation of the present invention.

A conveyor belt elevator 6 is also provided under the lifting conveyor belt 4, and the conveyor belt elevator 6 is connected to the two sets of movable conveyor belt 2 and the lifting conveyor belt 4 respectively through two sets of conveyor belt lifting levers 7 connected to its internal driving structure, for providing power for the movable conveyor belts 2 and the lifting conveyor belt 4.

The lifting conveyor belt 4 can move vertically upward driven by the conveyor belt elevator 6 and the conveyor belt lifting lever 7, and when the lifting conveyor belt 4 is moved to the maximum distance, the lifting conveyor belt 4 reaches a same horizontal level of the front section conveyor belt 1 and the rear section conveyor belt 3.

As shown in FIG. 3, the internal driving structure includes rotating mechanisms 9 one-to-one corresponding to the conveyor belt lifting levers 7 and a driving member 10 connected to a power source. Each of the rotating mechanism 9 is in a sector structure with gear formed at a curved surface thereof, and the driving member 10 is a movable gear rack connected to a power source. The movable gear rack can be moved up and down under the power of the power source, and the drive member 10 is engaged with the rotating mechanisms 9. It is apparent that the working way of the rotating mechanism in this embodiment should not limit the present invention, any implementation can be used in the present invention to rotate the rotation axis, for example, the gear structure in present embodiment can be replaced by worm structure.

The movable conveyor belt strut 71 and the lifting conveyor belt strut 73 are distributed in a V-shape obliquely disposed in a same common surface, and the two sets of conveyor belt lifting lever 7 are mirror symmetrical, and the V-shape opening portion facing to each other.

Each of the two sets of movable conveyor belt struts 71 is directly connected to a side of the respective two sets of movable conveyor belts 2 by a set of connecting strut 8. The two sets of lifting conveyor belt struts 73 are both connected to the side surface of the lifting conveyor belt 4 by a connecting strut 8-a backslash strut 72-a connecting strut 8 connected in that sequence.

The rotating mechanism 9 is disposed at the V-shape top end of the conveyor belt lifting lever 7, and is fixed to the conveying belt lifting lever 7. The connection between the backslash strut 72 and the connecting strut 8 is movable, and the connecting strut 8 is fixed to the lifting conveyor belt 4 and the lifting conveyor belt strut 73.

The working principle of the present invention is:

The present invention can be used to continuously and efficiently transfer materials on a disassembly line between a high and low position. See FIG. 1, the two sets of movable conveyor belts 2 are arranged side by side parallel between the front section conveyor belt 1 and the rear section conveyor belt 3, which constitutes the upper layer structure of the conveying device, and the lifting conveyor belt 4 is located directly below the two sets of movable conveyor belt 2. When the material is about to enter the front section conveyor belt 1, under the power of the conveyor belt elevator 6, the conveyor belt lifting lever 7, movable conveyor belt strut 71, backslash strut 72, lifting conveyor belt strut 73, connecting strut 8, rotating mechanism 9, drive member 10 as shown in FIG. 2 and FIG. 3 cooperatively drive two sets of the movable conveyor belts 2 in the form of mirror symmetrical and arc moves upward in the inverse direction, and the lifting conveying belt 4 is vertically rising to the interval of the front section conveyor belt 1 and the rear section conveyor belt 3, to receive the material on the front section conveyor belt 1.

The lifting conveyor belt 4 received the material continues to fall to a horizontal level of the lower conveyor belt 5 under the action of the conveying belt elevator 6 and the conveyor belt lifting lever 7, so that the material enters the lower conveyor belt 5, that is, the material transfer between the front section conveyor belt 1 at the upper layer and the lower conveyor belt 5 at the lower layer is completed.

At the same time, the two sets of movable conveyor belts 2 also reset to fill the interval between the front section conveyor belt 1 and the rear section conveyor belt 3, thus maintaining the integrity of the upper conveyor belt system. When the front section of the lower conveyor belt 5 has the conveyor belt, the lifting conveyor belt 4 is actually in a reset state, thus ensuring the integrity of the lower conveyor belt system, such that the upper and lower layers of conveyor belts can be used to transport the material. In the same way, the material of the lower layer can be transferred to the upper layer conveyor belt by the rise of the lifting conveyor belt 4, and the rise and fall reset frequency or interval of the lifting conveyor belt 4 and the movable conveyor belts 2 can be determined depending on the transport frequency of the material, or may be in a manner of optical sensor detection on the conveyor belt, and synchronous control to rise and fall, the present invention will not give more details here.

The above embodiments and principles are integrated, and the efficient transport of materials on the upper and lower layer conveyors is realized. At the same time, automatically reset immediately after the transfer, thus it is lowered to minimize influence of the efficiency of the transfer belt operation, no additional modification or formulation equipment of the disassembly line, improves the overall efficiency of the layered conveying device and has a large application range.

In the description of the present invention, it is to be pointed out that the terms "top", "under", "front", "left", "right", "top", "bottom", "inside", "outside" such orientation or position of the instructions such as is based on the orientation or positional relationship shown in the drawings, which is merely intended to describe the present invention and simplified description, rather than indicating or implying that the device or component must have a specific orientation. Specific orientation construction and operations cannot be understood as limiting the invention.

As described above, only the preferred embodiments of the present invention, but the scope of the invention is not limited thereto, and any technical personnel, those skilled in the art, can be easily thought of Change or replacement should be covered within the scope of the invention. Therefore, the scope of the invention should be based on the scope of protection of the claims.

What is claimed is:

1. A material layered conveying device based on a disassembly line, comprising a front section conveyor belt (1), a rear section conveyor belt (3), and a lower conveyor belt (5), the front section conveyor belt (1) and the rear section conveyor belt (3) horizontally arranged, an interval spacing between the front section conveyor belt (1) and the rear section conveyor belt (3), and the lower belt (5) arranged below and parallel to the front section conveyor belt (1) and the rear section conveyor belt (3), wherein two sets of movable conveyor belts (2) are arranged side by side in parallel in the interval between the front section conveyor belt (1) and the rear section conveyor belt (3);

a lifting conveyor belt (4) is arranged horizontal and adjacent to the lower layer conveyor (5) below the interval between the front section conveyor belt (1) and the rear section conveyor belt (3), and the length of the lifting conveyor belt (4) is equal to the interval length between the front section conveyor belt (1) and the rear section conveyor belt (3);

a conveyor belt elevator (6) is arranged below the lifting conveyor belt (4), and the conveyor belt elevator (6) is connected to the two sets of movable conveyor belts (2) and the lifting conveyor belt (4), through two sets of conveyor belt lifting levers (7) connected to an internal driving structure of the conveyor belt elevator (6), wherein the internal driving structure comprises rotating mechanisms (9) one-to-one corresponding to the conveyor belt lifting levers (7) and a driving member (10) connected to a power source, and the drive member (10) and the rotating mechanism (9) are in engaged cooperation;

each of the conveyor belt lifting levers (7) comprises a movable conveyor belt strut (71), a backslash strut (72), and a lifting conveyor belt strut (73), the movable conveyor belt strut (71) and the lifting conveyor belt strut (73) in V-shape obliquely distributed in a common plane, the two sets of conveyor belt lift levers (7) are mirror symmetry, and the V-shape opening portion facing to each other;

the lifting conveyor belt (4) is capable of moving vertically upwards driven by the conveyor belt elevator (6) and the conveyor belt lifting lever (7), and when the lifting conveyor belt (4) is moved to a maximum distance, the lifting conveyor belt (4) reaches a horizontal level with the front section conveyor belt (1) and the rear section conveyor belt (3).

2. The material layered conveying device based on a disassembly line according to claim 1, wherein the two sets of the movable belt struts (71) each are directly connected to a side of the respective two sets of movable conveyor belts (2) by a set of connecting strut (8); the two sets of lifting conveyor belt struts (73) are both connected to a side of the lifting conveyor belt (4) through a connecting strut (8)-a backslash strut (72)-a connecting strut (8) connected in a sequence.

3. The material layered conveying device based on a disassembly line according to claim 2, wherein the rotating mechanism (9) is disposed at the V-shape top end of the conveyor belt lift lever (7), and is fixed to the conveyor belt lifting lever (7).

4. The material layered conveying device based on a disassembly line according to claim 2, where the backslash strut (72) is movably connected to the connecting strut (8).

5. The material layered conveying device based on a disassembly line according to claim 4, wherein the connecting strut (8) is fixed to both the lifting conveyor belt (4) and the lifting conveyor belt strut (73).

* * * * *